United States Patent

[11] 3,545,674

[72] Inventor Richard B. Hanbicki
   Princeton Junction, New Jersey
[21] Appl. No. 765,152
[22] Filed Oct. 4, 1968
[45] Patented Dec. 8, 1970
[73] Assignee Madatron Corporation
   Rocky Hill, New Jersey
   a corporation of New Jersey

[54] PNEUMATICALLY OPERATED COUNTING DEVICE
   14 Claims, 10 Drawing Figs.
[52] U.S. Cl. ................................. 235/98,
   73/37
[51] Int. Cl. .......................................... G06m 11/00
[50] Field of Search .......................... 235/98;
   73/37, 149, 290(B); 221/(Inquired)

[56] References Cited
   UNITED STATES PATENTS
   2,116,636  5/1938  Neumann .................. 73/290
   3,060,724  10/1962 Smith et al .................. 73/149
   3,113,448  12/1963 Hardway et al .............. 73/149

Primary Examiner—Richard B. Wilkinson
Assistant Examiner—Lawrence R. Franklin
Attorney—Ostrolenk, Faber, Gerb and Soffen ABSTRACT: Apparatus for counting articles employing a pneumatic technique. Components of substantially uniform size which are to be counted are placed within a container of known volume and a small sample batch of such components are placed within a smaller container also of known volume. A constant pressure source is caused to fill the smaller container until a predetermined pressure is reached, at which time the time duration required for this operation is reported, preferably by electronic means. The constant pressure source is then introduced into the larger container until the same pressure value is reached during which time the electronic recording of time duration divided by the time duration necessary to pressurize the smaller volume container, is compared against the larger time duration to thereby provide a direct reading of the quantity of parts being measured. The pressure sources may be piston driven means operated in such a manner as to cause the procedure to be adiabatic.

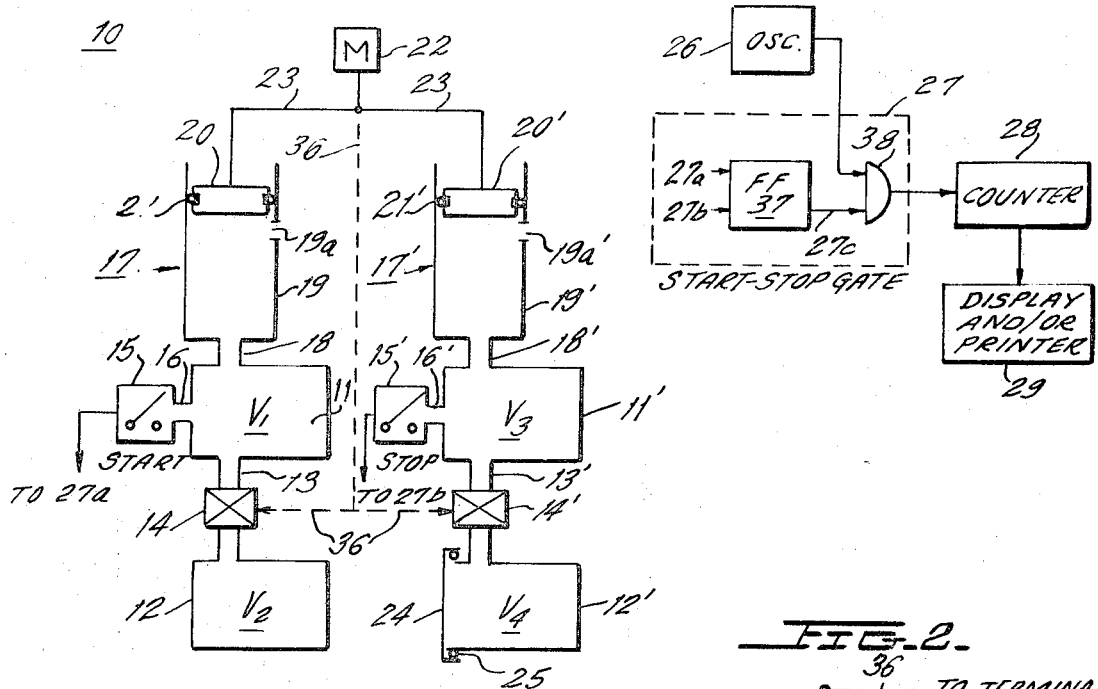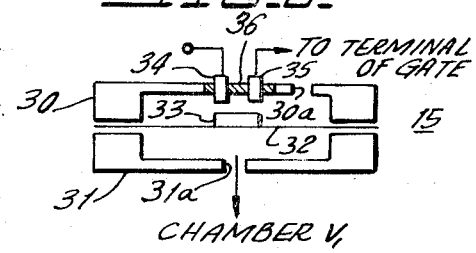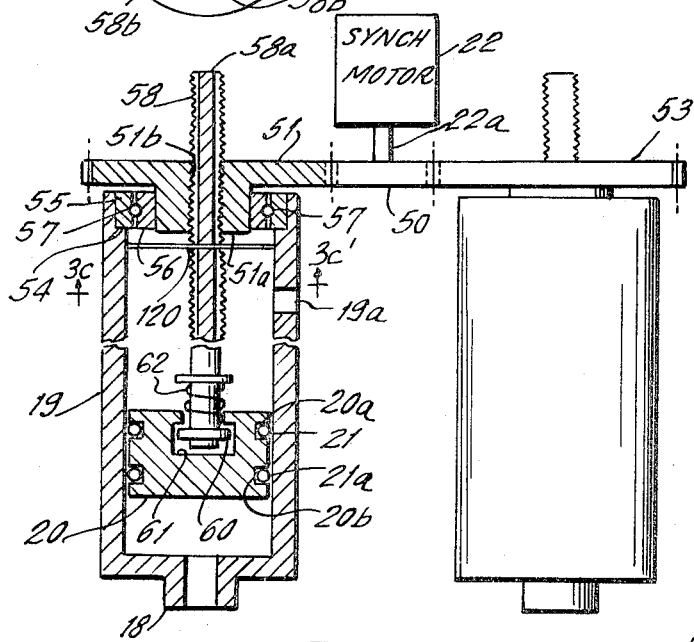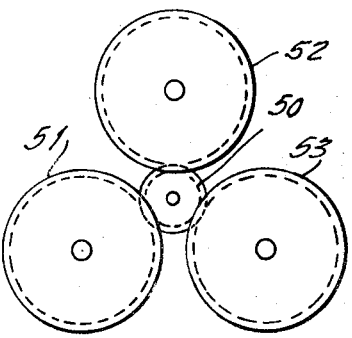
FIG. 1.
FIG. 2.
FIG. 3c.
FIG. 3b.
FIG. 3a.
INVENTOR.
RICHARD B. HANBICKI
BY
OSTROLENK, FABER, GERB & SOFFEN
ATTORNEYS

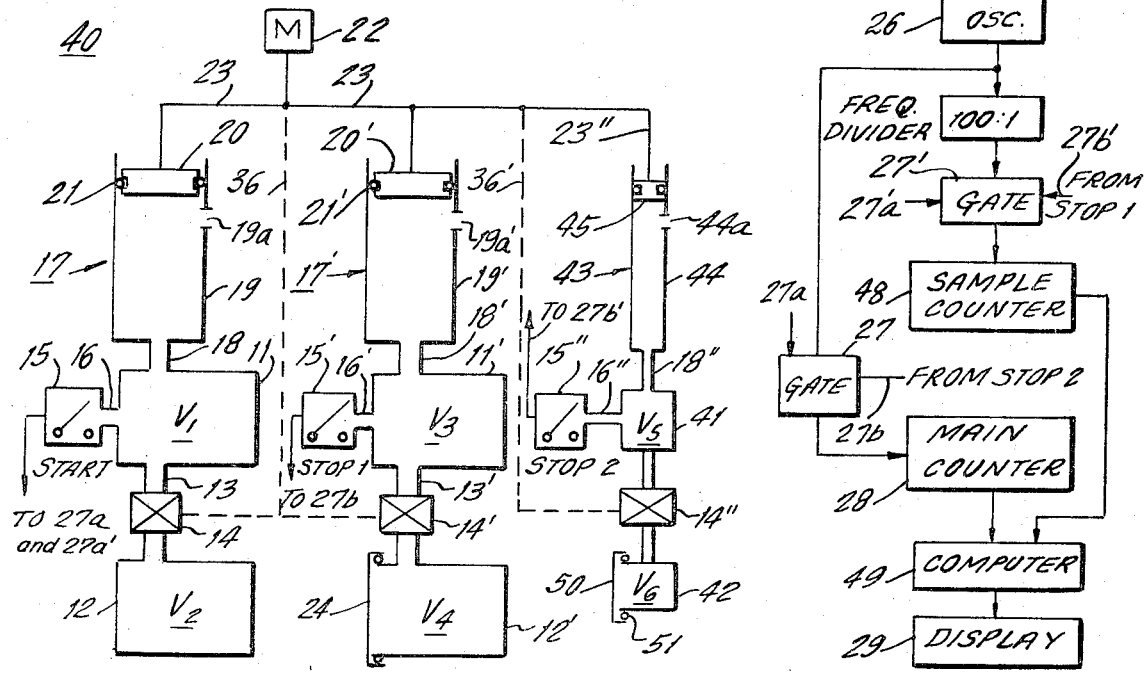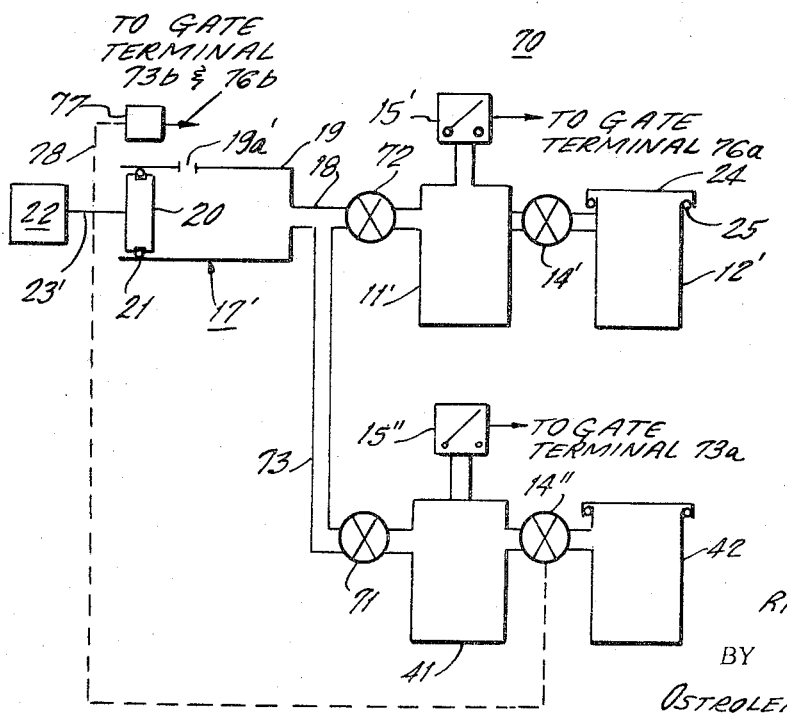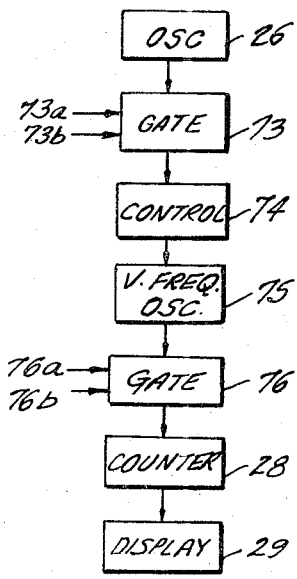

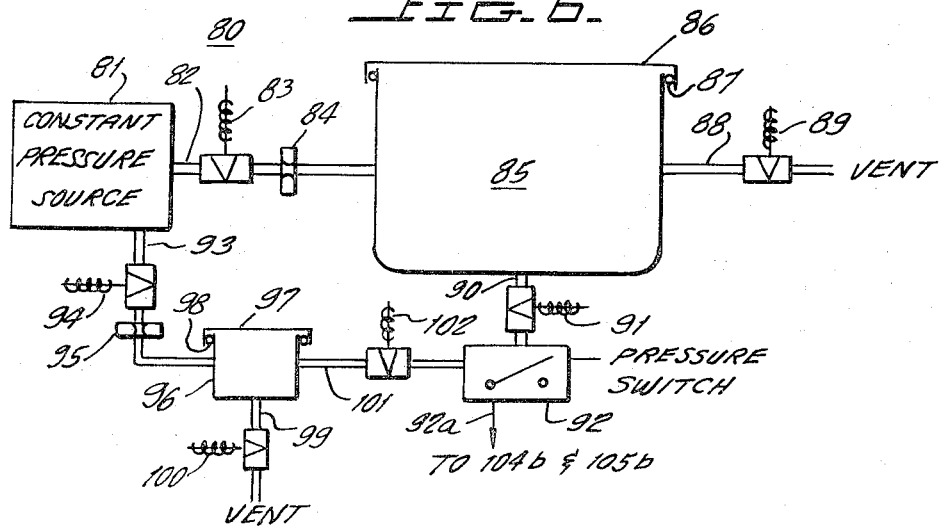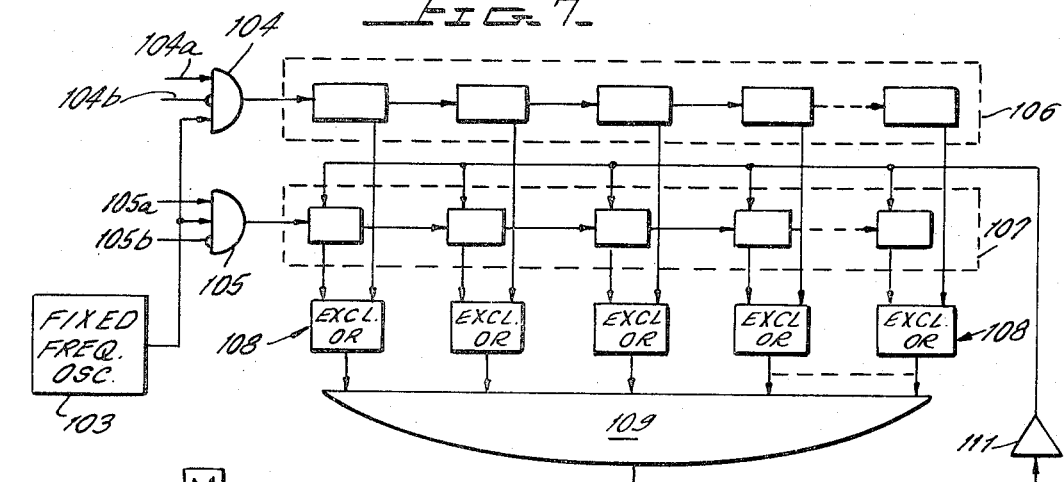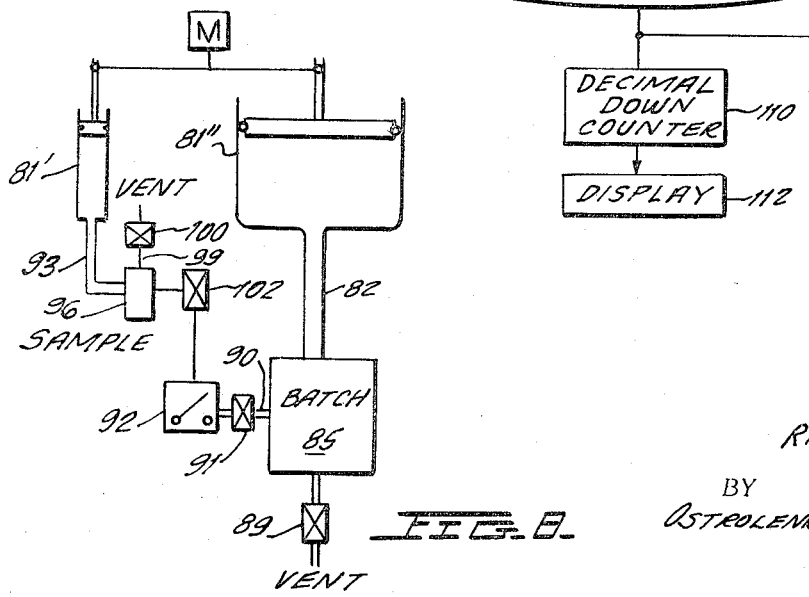

PNEUMATICALLY OPERATED COUNTING DEVICE

Alternative embodiments employ a pair of containers of known volume wherein the parts to be counted are introduced into one of the containers. After raising the empty container to a predetermined pressure, the containers are then pressure equalized by opening a conduit therebetween and subsequently closing the conduit, at which time the pressure of the empty container is reduced to ambient pressure. The time duration required for depressurization at a known, constant flow rate is automatically converted, preferably electronically, into an accurate count of the substantially uniform parts being measured. The predetermined pressure which is monitored may be ambient and may be accomplished either in the presence of or absence of sample volume means.

The present invention relates to counting devices and more particularly to a novel system for simply, rapidly and accurately counting a large quantity of substantially uniform parts or other items through the use of a pneumatic concept.

Presently there exists a very large variety of applications and industries in which there is a need for accurately determining the quantity of a large batch of components (which are of substantially uniform size) in order to ascertain the number of such parts to be produced by a manufacturer, shipped to a supplier to fill a predetermined order, or for the purposes of taking inventory, or for any other possible application in which fairly large quantities of such parts must be counted.

One conventional technique of counting large quantities of substantially uniform parts is comprised of weighing such components upon a scale. Once the weight is determined, a known constant is multiplied against the weight to convert the reading into a total number of parts or a table may be employed to convert weight reading into quantity. In order to make such measurements accurately, the operator must wait until the scale is balanced, thereby requiring additional time until a balanced condition is achieved. The higher the accuracy required the longer it takes for such scales to balance. In addition, such measuring devices normally require extremely delicate handling and must be serviced at regular periodic intervals to guarantee reliable operation.

The present invention is characterized by providing a novel counting device which is highly accurate and reliable and may be simply and easily used by an operator and further does not require frequent periodic maintenance to attain accuracy, as is the case with devices of the weighing type presently in use.

The preferred embodiment is comprised of a pair of containers of known and equal volume. The components of uniform size to be counted are placed in a first one of said containers. The containers which are coupled to one another through an initially open valve means are raised to a predetermined pressure. The valve means is then closed, isolating the container housing the components to be counted from the pressure source. Simultaneously therewith a pair of second containers, whose interior volume is also known and which are coupled together through initially open valve means, are likewise pressurized by a second pressure source. Both such containers remain empty during the operation. After pressurization of both pairs of containers, the valves coupling the associated pairs, are then closed to isolate one of the containers of each pair from the pressure source. The container of one pair, which is so isolated, houses the components being counted.

The constant flow rate depressurization operation, which is an adiabatic process, is monitored by pressure sensitive switches each coupled to a container which is in communication with its depressurizing source. The pair of containers which are coupled together and which house no components will have its container coupled to the depressurizing source and be the first to return to ambient pressure. The monitoring of this condition initiates the operation of counting means, preferably of an electronic design. The pressure of the remaining container coupled to its pressure source will require more time to reach ambient condition due to the reduced interior volumes (and hence increased pressure) of the container pair as a result of presence of the components being measured. The depressurizing operation is monitored by a highly sensitive pressure switch which, upon sensing ambient condition, terminates the operation of the counting means which now contains an accurate indication of the volume occupied by the parts to be counted. This volume measurement may be converted into a count through the knowledge of the size of the components. Alternatively, the counting equipment may be preset in accordance with the volume of the components to be measured so as to provide a direct read-out of the particular count.

In an alternative embodiment, a third pair of containers of substantially smaller known volume are operated in a substantially similar manner, one of which is provided with a sample number (for example, 10 pieces) of the components to be counted. The operation is similar to the embodiment previously described wherein the first pair of containers, which are devoid of any components, initiate the count in a first of two counting devices. Pressure sensitive switches for the second and third pairs of containers are caused to terminate the counts of their associated counters. Either comparison or direct calculation of the volume-representative readings provides an immediate and accurate indication of the number of parts being counted. Utilization of a sample of pieces affords the additional significant advantage of averaging out deviations in the size (i.e. volume) of the component parts from ideal size.

Pressurizing of the pairs of containers is performed by synchronous-motor-driven pistons all operated in unison, preferably by single motor means mechanically coupled to the pistons by suitable mechanical means.

Various alternative embodiments having substantially similar design concepts may also be devised from the above techniques. In one alternative embodiment employing two pairs of interconnected containers, a first sample container pair is operated in a somewhat similar manner to that previously described for the purpose of "setting" the counting means which, by monitoring the second pair of containers one of which houses the large batch of components to be counted, then provides a direct read-out of the total count. As a further alternative, the count which is representative of the sample batch (of known quantity) may be employed as a divisor during the time at which the count of the large quantity batch is being performed to provide a direct read-out of the total count of components.

The pressurizing sources may alternatively be constant pressure generating sources which may be advantageously used in certain of the embodiments described herein and consequently alternative pressure monitoring means for monitoring pressure levels other than ambient may be employed in conjunction with the use of either or both types of pressurizing sources.

It is therefore one object of the present invention to provide a novel means for counting large batches of components of substantially uniform size through the use of pneumatic principles.

Another object of the present invention is to provide novel means employing pneumatic techniques for counting large quantities of components of substantially uniform size wherein a volume-representing measurement is converted into a count of the total number of components.

Still another object of the present invention is to provide a novel means for determining the count of a large batch of components of substantially uniform size through the employment of a pneumatic principle wherein a quantity representative of a pneumatic measurement of the large batch of components is compared against a quantity representative of the measurement of a small "sample" batch for providing a direct output reading representative of the total number of components contained in the large batch.

These as well as other objects of the present invention will become apparent when reading the accompanying description and drawings in which:

FIG. 1 is a block diagram showing one preferred embodiment of the present invention.

FIG. 2 is a sectional view showing in detail, one preferred type of pressure sensitive switch which may be employed in the embodiment of FIG. 1.

FIG. 3a shows a portion of the system of FIG. 1 in greater detail.

FIG. 3b is a top view of the arrangement of FIG. 3a.

FIG. 3c shows a view of a portion of FIG. 3a looking in the direction of 3c—3c.

FIGS. 4 and 5—8 show other alternative embodiments of the present invention.

The system 10 of FIG. 1 is comprised of a first pair of containers 11 and 12 whose interior volumes ($V_1$ and $V_2$ respectively) are known and are equal to one another ($V_1=V_2$). The containers are coupled to one another through a conduit 13 which may be selectively opened and closed by valve means 14. A pressure sensitive switch 15 is coupled to the interior of chamber 11 by conduit 16. A pressurizing source 17 is coupled to chamber 11 by means of a conduit 18. The pressure source, in the embodiment of FIG. 1, is comprised of a piston and cylinder combination 19—20. The cylinder is provided with a vent 19a for reducing pressure within the cylinder interior to ambient pressure when the piston is in the uppermost position, as shown in FIG. 1. The piston may be provided with an O-ring 21 seated within a suitable annular groove provided in the piston.

The remainder of the pneumatic arrangement is substantially identical to that already described wherein like components have been indicated by primed numbers. Thus, the chambers 11' and 12' are identical to the chambers 11 and 12 respectively, the pressure sensitive switches 15 and 15' are identical, and so forth. In addition thereto, the interior volumes of containers 11' ($V_3$) and 12' ($V_4$) are equal to one another and are equal to the interior volumes of chambers 11 and 12 (i.e., $V_1=V_2=V_3=V_4$).

The pistons 20 and 20' are operated by a motor means 22 and are ganged together to move in unison by mechanical means shown schematically as the mechanical links 23 and 23'.

Chamber 12' is provided with a cover member 24, shown in schematic fashion, which may be removed for the purpose of inserting the large batch of components to be measured which operation will be more fully described. The cover or remainder of the chamber may be provided with an O-ring or other form of gasket 25 to provide a good airtight seal for the chamber after replacement of the cover 24 upon the chamber.

The system is further comprised of an oscillator 26 whose output is coupled to a start-stop gate 27 which selectively couples the output of oscillator 26 through gate 27 to a counter 28 which may, for example, be an electronic or electromechanical counter for counting the pulses generated by oscillator 26 which are passed through gate 27. The counter may, for example, be a multistage electronic counter comprised of a plurality of interconnected flip-flop or other suitable bistable circuits. The counter may be directly connected to a display and/or printer 29 capable of providing a visual display of the count in counter 28 and/or capable of producing a printout of the count generated by the counter.

FIG. 2 shows one preferred embodiment of the pressure switches 15 and 15' which may be employed in system 10. The pressure switch is comprised of a pair of substantially dish-shaped metallic members 30 and 31. A thin resilient sheet 32 of circular configuration is sandwiched between members 30 and 31 so that its peripheral portion is firmly embraced between the annular-shaped surface portions of members 30 and 31. This may be accomplished through the use of threaded fastening means, adhesives, brackets, or any other suitable means. The resilient member 32 acts as an airtight barrier between a centrally located opening 31a provided in member 31 and an offset opening 30a provided in member 30.

Resilient member 32 may be formed of any suitable resilient material such as a rubber or plastic or may be formed of a thin metallic material in certain applications. In the case where a rubber-type or highly flexible material is employed, the member 32 need not be stretched so as to be tautly held between the opposing marginal surfaces of members 30 and 31. A centrally located contact 33 is secured to one surface of member 32. A pair of contacts 34 and 35 are secured within suitable openings provided in member 30 for the purpose of establishing an electrical circuit for operation of the gate circuit, in a manner to be more fully described. In the case where member 30 is formed of a metallic material, contacts 34 and 35 are electrically insulated from member 30 by suitable insulation means 36, electrically isolating the contacts from one another as well as from metallic body 30. As an alternative arrangement, if member 30 is formed of a suitable insulating material, the contacts 34 and 35 need only be separated from one another by an amount sufficient to provide electrical insulation therebetween while being sufficiently close to one another so as to be electrically connected to one another by bridging contact 33, in a manner to be more fully described. Electrical contact 34 may, for example, be connected to a voltage source V while electrical contact 35 is connected to one input terminal of gate means 27.

The operation of the embodiment 10 of FIG. 1 is as follows:

Let it be assumed that it is desired to count a large batch of relatively small parts of substantially uniform size (i.e. volume). Such parts may, for example, be nuts, bolts, washers, ceramic components or any other items of relatively small size. The pistons 20 and 20' are moved to the solid line position, shown in FIG. 1, so that the vents 19a and 19a' of cylinders 19 and 19' are unsealed, placing the interiors of the cylinders at ambient pressure.

The cover 24 of chamber 12' is removed and the batch of components to be counted is placed within the chamber. Cover 24 is then replaced to airtightly seal chamber 12'. Motor means 22 is energized to drive pistons 20 and 20' downwardly toward the bottom of their cylinders. The mechanical linkage is such that the pistons are driven in unison. The pistons, upon passing their associated vents 19a and 19a', compress the air within the chamber interiors forcing it to enter through the conduits 18 and 18' into chambers 11 and 11'. The volumetric ratios of the chambers 19 and 19' may, for example, be approximately one-fifteenth of the combined volume of chambers 11—12 and 11'—12' respectively, so as to raise the pressure within these chambers to approximately 1 p.s.i. Obviously, any ratio may be employed if desired.

The valves 14 and 14' are maintained in the open position at this time. As soon as the pistons move past and seal their associated vents, the pressure within the chamber pairs 11—12 and 11'—12' begins to increase, causing the resilient members 32 of their pressure sensitive switches to move in the direction of their associated contact pair 34—35 which causes bridging contact 33 to establish an electrical path from voltage source V through contact 34, bridging contact 33 and contact 35 to their associated input terminals 27a and 27b of gate means 27. Oscillator 26 may be deactivated at this time.

Immediately after the pistons 20 and 20' reach the bottom-most position within their associated chambers 19 and 19', valve means 14 and 14' are closed, thereby isolating chambers 12 and 12' from the pressure sources 17 and 17' respectively. The closure of valves 14 and 14' may be performed automatically through suitable mechanical linkage as represented by the dotted lines 36. Since the interior volume of chamber 11 is identical to the interior volume of chamber 12, the gas compressed into the chambers will be divided equally between the two chambers and the gas pressure in the chambers will be equal. However, due to the presence of the large batch of components inserted into chamber 12', the gas forced into the chamber pair 11' and 12' will be unequally distributed between the two chambers with the larger volume of gas being contained within chamber 11'.

The operation of motor 22 may be either manually or automatically reversed so as to simultaneously drive pistons 20 and 20' upwardly in order to depressurize chambers 11 and 11' respectively. Chambers 12 and 12' will not be depressurized at this time due to the closure of valves 14 and 14' respectively.

Since chamber 11' contains a larger quantity of gas (i.e. gas at a higher pressure) chamber 11 will return to ambient pressure sooner than chamber 11'. The return to ambient pressure condition will be sensed by pressure sensitive switch 15. Prior to the return to ambient pressure, electrical engagement of contact 33 in both pressure sensitive switches 15 and 15' with its associated contact pair 34,35 couples a bias level to each of the input terminals 27a and 27b of start-stop gate circuit 27. The gate circuitry may be comprised of a two-input bistable flip-flop circuit 37 having one output terminal coupled to the input of an AND gate 38 whose remaining input terminal is coupled to the output of oscillator 26. The bias voltages at this time may be selected so as to place reverse bias levels at input terminals 17a and 27b, causing the output terminal 27c to remain Off and thereby block the output of oscillator 26 from reaching counter 28.

As was previously described, chamber 11 will reach ambient pressure prior to chamber 11', causing the resilient member 32 of pressure sensitive switch 15 to move downwardly (relative to FIG. 2). This results in the fact that the underside of member 32, which communicates with the interior of chamber 11 through conduit 16, is at a pressure at least equal to or slightly less than the pressure on the upper side of member 32 which communicates with ambient pressure through opening 30a. This causes contact 33 to be disengaged from contacts 34 and 35, removing the reverse bias level from input terminal 27a. This causes output terminal 27c to go to the ON state which thereby enables AND gate 38 to pass the output of oscillator 26 to the input of counter 28. Counter 28 thus counts the number of pulses passed during this time.

The return of the interior of chamber 11' to ambient pressure occurs subsequent to chamber 11 (dependent upon the number of components originally placed in chamber 12') at which time the operation of pressure sensitive switch 15' causes disengagement of its bridging contact 33 from contacts 34 and 35 to remove the reverse bias from the input terminal 27b of flip-flop 37. This causes output terminal 27c to go to the OFF state to block AND gate 38 from applying the output of oscillator 26 to counter 28. Thus, the count developed in counter 28 is representative of the volume of the uniform components placed within chamber 12'.

Motor means 22 is operated until the pistons return to the position shown in FIG. 1, at which time the valves 14 and 14' are again opened through the mechanical linkage 36. Counter 28 may be coupled to a suitable visual display device which may, for example, be of the type described in copending Pat. application Ser. No. 718,553 filed Apr. 3, 1968 and assigned to the assignee of the present application. Obviously, any other display means may be employed, if desired. Alternatively, the display means may be a printer capable of printing out the output of counter 28 or may include both a print-out and a display. In one application, the displayed count may be divided by a quantity representative of the volume of an individual component in order to obtain the count of the components. As another alternative, oscillator 26 may be an adjustable frequency oscillator which may be preset to an operating frequency representative of the volume of the particular parts being counted so that the display may directly represent the total number of parts. As still another alternative, the counter and display means may include automatic computational means which automatically and preferably electronically divides the count developed by a quantity representing the volume of a component to provide a direct output of the total quantity of parts. Preferably the components being counted should occupy an appreciable amount (preferably greater than one-half) of the interior volume of chamber 12'.

FIG. 4 shows an alternative embodiment 40 of the present invention in which like components as between FIGS. 1 and 4 are designated by like numerals. The apparatus of FIG. 4 differs from that shown in FIG. 1 by the addition of a third pair of chambers 41 and 42 whose interior volumes ($V_5$ and $V_6$) are equal to one another and are significantly smaller than any of the volumes $V_1$—$V_4$. The chambers 41 and 42 are coupled to one another by means of a conduit 13" having a valve means 14" which is normally in the open position in the same manner as was previously described with regard to valve means 14 and 14'. Chamber 41 is coupled to a pressure sensitive switch 15", of the same type previously described, through a conduit 16". Chamber 41 is coupled to a pressure source 42 through conduit 18". The pressure source 42 is comprised of a cylinder 44, piston 45 and O-ring 46 whose dimensions are significantly reduced as compared with either pressure source 17 or 17'. The ratio of the interior volume of cylinder 44 relative to the combined interior volumes $V_5$ and $V_6$ is substantially the same ratio as that formed between the interior of cylinder 19' and the volumes $V_3$ and $V_4$, for example. In a like manner, piston 45 is mechanically coupled through linkage 23" to the motor source 22.

The added circuitry of FIG. 4 is comprised of a start-stop gate 27' substantially identical to gate 27 already described. Gate 27' has its AND gate 38' coupled to oscillator 26 through frequency divider 47. The output of gate 27' is coupled to the input of a "sample" counter 48 which may be substantially similar to main counter 28 with the exception of being comprised of fewer stages. The outputs of counters 28 and 48 may be combined in a computer 49 for dividing the count in counter 28 by the count developed in counter 48 to obtain the final output in a manner to be more fully described.

The chamber 42, although smaller in internal volume than chamber 12', is similarly constructed in that it is provided with a cover 50 which may be removed and upon replacement upon chamber 42 provide an airtight fitting through the use of a suitable gasket, O-ring or other similar structure 51. Chamber 42 is provided for the purpose of receiving a "sample" batch of components in a manner to be more fully described.

The operation of the apparatus of FIG. 4 is as follows:

Let it be assumed that a large batch of items of small substantially uniform size are to be counted. The sample number of such items, for example, 10 such items, are selected from the batch and placed in chamber 42. The remainder of the batch of components which may number in the hundreds or even thousands, are then placed in chamber 12'. The covers 50 and 24 of chambers 42 and 12' respectively, are replaced in a manner so as to airtightly seal the chambers. Motor 22 is energized, causing the pistons 20, 20' and 45 to be operated in unison through mechanical linkages 23, 23' and 23" respectively. All of the pistons pass their respective vents 19a, 19a' and 44a' respectively, causing the gas sealed in their respective cylinders to be urged into the chamber pairs 11—12, 11'—12' and 41—42 respectively. This is made possible due to the fact that the valves 14—14" are open at this time. Motor 22 is operated until the respective pistons reach the bottom of their piston chambers. At this time, due to the equal volumes ($V_1$ and $V_2$) of chambers 11 and 12 the pressure in each of these chambers is substantially equal. However, due to the presence of the batch of components in chamber 12' and the sample group of components in chamber 42, the pressure in these chamber pairs is greater than the pressure in chambers 11—12.

As soon as the pistons reach the bottom of their respective cylinders the mechanical linkages 36 and 36' close valves 14-—14". Motor means 22 is then either manually or automatically reversed causing the pistons to be driven upwardly from the bottom position to reduce the pressure in each of the chambers 11, 11' and 41 which communicate with their associated cylinders through conduits 18—18" respectively. Due to the fact that the pressure in chamber 11 is lower than the pressure in either chamber 11' or chamber 41, chamber 11 will reach ambient condition before chambers 11' and 41.

As soon as motor 22 is reversed, oscillator 26 becomes energized. However, due to the fact that the resilient members of each of the pressure sensitive switches 15—15" have their bridging contacts engaging the cooperating contacts, the bistable flip-flop circuits have their output terminals in the OFF state. As soon as the pressure in chamber 11 reaches ambient pressure, the pressure sensitive switch 15 opens, applying a forward bias simultaneously to the input terminals 27a and 27a' of gates 27 and 27' respectively. This causes the output terminals of each of these gates to go to the ON state, enabling their AND gates to apply the output of oscillator 26 to their respective counters. Frequency divider circuit 47 may, for example, be a 100:1 frequency divider, causing one pulse to be applied to the input of sample counter 48 for every 100 pulses applied to the input of main counter 28.

The pressure levels in each of the chambers 11' and 41 will reach ambient condition at some time subsequent to the pressure level in chamber 11. It is immaterial as to when either of these chambers reach ambient condition. However, as soon as the ambient pressure level is reached, the pressure of switches 15' and 15" operate in a manner similar to that previously described to remove reverse bias from their respective input terminals 27b and 27b' to block any additional pulses from oscillator 26 and frequency divider 47 respectively, from reaching their associated counters. At this time, sample counter 48 has developed a count representative of the volume occupied by the sample batch of 10 components while counter 28 contains a count representative of the volume occupied by the large quantity batch of components contained in chamber 12'. It is not necessary to determine or have any previous knowledge of the actual volume of a typical standard component since this factor is unnecessary in arriving at the total number of components. The total number of components is determined simply by dividing the count developed in counter 28 by the count developed in counter 48 which may be done by a simple dividing circuit 49 which, although it may be a computer, need only be an electronic or an electromechanical circuit capable of dividing the large batch count by the sample batch count. The result of this operation may be directly displayed and/or printed by circuit means 29.

The distinct advantage of the embodiment shown in FIG. 4 resides in the fact that the selection of a "sample" group of components averages out any volume differences in the components which are known to result as a practical matter in mass production manufacturing techniques. The ratio of the output of frequency divider 47 and the output of oscillator 26 should be the same as the ratio of the total internal volume of containers 41—42 relative to the total internal volume of containers 11' and 12', for example, to thereby provide a very accurate count of the large quantity batch.

FIGS. 3a and 3b show additional detailed views of the manner in which the pistons of each pressure source may be driven. As shown in these FIGS., the motor means 22 which may, for example, be a synchronous motor, has its output shaft 22a driving a central gear 50. The gear 50 is centrally located as can best be seen from a consideration of FIG. 3b and meshes with three gears 51—53 respectively, each of which is employed to drive its associated piston. FIG. 3a shows only one of the piston arrangements in detail, it being understood that the remaining piston assemblies are substantially identical in design and operation. It should also be obvious that the arrangement of FIGS. 3a and 3b may be employed for the system 10 of FIG. 1 simply by elimination of one of the gears 51—53 due to the fact that only two pistons are employed in the embodiment of FIG. 1.

Referring to the detailed view of one piston assembly, for example, the piston assembly 19, this assembly is provided with a vent 19a and a conduit or opening 18 at its lower end for coupling to the chamber 11 of either of the embodiments of FIGS. 1 or 4. The piston 20 is slightly modified from that shown in FIGS. 1 and 4 in that it is provided with two annular-shaped grooves 20a and 20b for receiving a pair of O-rings 21 and 21a respectively, in order to provide for an excellent moving seal between the interior wall of chamber 19 and piston 20.

The upper end of chamber 19 is provided with an annular-shaped notch 54 receiving a ball bearing assembly in which an outer race 55 is positioned upon the shoulder of notch 54 and is mechanically secured within notch 54. The inner race 56 is not fixed to cylinder 19 but is free to rotate relative to outer race 55. Each of the races are provided with semicircular-shaped grooves for receiving a plurality of ball bearings 57. The gear 51 is provided with a collar portion 51a which may be force-fitted or otherwise secured to the interior surface of inner race 56 so as to rotate therewith. The central opening 51b of gear 51 is threaded to receive and threadedly engage an elongated threaded member 58. The threaded member 58, shown in cross section in FIG. 3, is provided with a pair of longitudinal guide grooves 58b, 58b. Projections 121,121 are provided in spaced relationship around the opening 122 in disc 120, which is secured to chamber 19, just below gear 51. This arrangement prevents member 58 from experiencing any rotation about its longitudinal axis. The lower end of elongated member 58 has secured thereto a circular collar 60 which is seated within a cavity 61 provided in the upper end of piston 20. The mouth of the cavity 61 is smaller in diameter than the base of the cavity 61 so as to embrace collar 60 and prevent collar 60 from being removed from the cavity 61 provided in the piston 20. A helical spring member 62 is positioned around the lower portion of member 58 and has its lower end bearing against the upper surface of piston 20 while its upper end bears against the undersurface of a second collar 63 provided on member 58.

In operation, the energization of synchronous motor 22 in a first direction causes rotation of its output shaft which couples this rotation through gear 50 to gears 51—53. Gear 51 is prohibited from experiencing any linear movement but is free to rotate about its central axis within the ball bearing assembly previously described. This rotation causes shaft 58, which is prohibited from rotating about its longitudinal axis, to be driven downwardly causing the piston 20 to be moved from its uppermost position to its lowermost position. Obviously, energization of synchronous motor 22 in the reverse direction will enable movement of the piston from its lowermost position toward its uppermost position.

The spring assembly 62 is provided to permit movement of piston 20 only when synchronous motor 22 reaches synchronous speed (during depressurization) which, although quite rapid, nevertheless requires some finite time.

Let it be assumed that piston 20 is at its uppermost position. In its uppermost position, the force provided by spring 62 is sufficient to cause collar 60 to firmly engage the underside of the narrow mouth portion of cavity 61. As the operation of synchronous motor 22 is initiated, elongated member 58 will be moved vertically downward driving piston 28 downwardly through spring 62. Synchronous motor 22 coasts to a stop after piston 20 reaches its lowermost position causing spring 62 to be somewhat compressed.

Operating in the reverse direction, collar 60 will now be close to the base of cavity 61 in piston 20. As soon as the operation of synchronous motor 22 is reversed, elongated member 58 will begin its upward vertical movement until the upper surface of collar 50 bears against the inner surface of mouth portion of cavity 61, at which time piston 20 will be driven vertically upward. As soon as the movement of elongated member 58 is imparted to piston 20, synchronous motor 22 will have reached synchronous speed, allowing piston 20 to be moved upwardly at a constant velocity. The depth of cavity 61 is chosen to be sufficient to allow synchronous motor 22 to reach synchronous speed before the upward movement of member 58 is imparted to piston 20.

FIG. 5 shows still another alternative embodiment of the instant invention which bears closest resemblance to the embodiment of FIG. 4 and in which like components are designated with like numerals. Since all of the components of the system 70 of FIG. 5 have been previously identified, a description thereof will be dispensed with in favor of the operational procedure which occurs as follows:

Let it be assumed that it is desired to count a large quantity of components of substantially uniform size (i.e., volume). A "sample" batch (for example, 10 pieces) is selected from the large quantity batch and placed in chamber 42 in the same manner as was previously described with respect to FIG. 4. Valves 14', 14" and 72 are closed and motor source 72 is energized, causing piston 20 to be driven to the bottom of piston cylinder 19. The air compressed in the cylinder is passed through conduit 73 and open valve 71 to pressurize chamber 41. As soon as piston 20 reaches the bottom of chamber 19 the mechanical linkage represented by dotted line 36' will open valve 14" for a short time interval and will subsequently close valve 14". In the case where chamber 42 is empty, the pressure in chamber 41 would be reduced by one-half due to the fact that the volumes of chambers 41 and 42 are equal, causing the gas pressure to be reduced to one-half the pressure of chamber 41 prior to the opening of valve 14". After the closure of valve 14" at a time which the pressure is equalized between the two chambers 41 and 42, synchronous motor 22 is driven in the reverse direction to depressurize chamber 41. Pressure sensitive switch 15" differs from the pressure sensitive switches previously described in that it is adapted to sense the condition of one-half pressure valve which would otherwise exist in chamber 41 in the absence of any sample or components in chamber 42. Due to the fact that a sample batch of components is provided in chamber 42, chamber 41 will reach one-half its normal pressure condition when piston 20 reaches some point intermediate the extreme limits of its motion. As soon as this pressure condition is reached, the pressure sensitive switch 15" activates gate means 73 at its first terminal 73a enabling pulses to be passed by oscillator 26 where these pulses may be counted by control circuit 74. The gate is closed as soon as piston 20 reaches the end of its travel activated by switch 77 which is activated by the mechanical linkage 78. Control circuit 74 may, for example, be a multistage counting device having a decoding circuit for converting a total count into an analogue value which analogue value is applied to the input of a variable frequency oscillator of the voltage controlled type wherein the voltage level applied at its input terminal controls the frequency of the oscillator output.

Immediately upon completion of this operation, the removable lid 24 of chamber 12' is removed, the batch of components to be counted is placed within the chamber and cover 24 is then replaced in an airtight manner (for example, by means of an O-ring or other gasket 25).

Valve 71 is then closed, valve 14' is retained in the closed position and valve 72 is opened. Motor means 22 is operated to drive the piston 20 from its left-hand most position to the right-hand most position within piston chamber 19. The interior volume of piston chamber 19 is proportional to the total volume of chambers 11' and 12' (whose interior volumes are equal to one another) so that in one example the pressure in chamber 11' with valve 14' closed will be raised to 1 p.s.i. and the piston is driven to its extreme right-hand most position.

The valve means 14' is then opened either automatically or manually (the automatic operation being controlled through the mechanical coupling between motor means 22 and valve means 14' in the manner previously described) to allow the pressure to equalize between the two chambers. A very brief time interval thereafter valve means 14' is then returned to the closed position and piston 20 is operated by motor means 22 to move from its extreme right-hand most position back to the start position. In the case where the operation just described is performed with chamber 12' completely empty, pressure equalization would cause one-half p.s.i. to be contained within chambers 11' and 12'. However, since a major portion of the interior volume of chamber 12' is occupied by the components being counted, the equalized pressure will be much greater than one-half p.s.i. in chamber 11'. Pressure sensitive switch 15' detects the one-half p.s.i. level for the purpose of enabling gate 76 which operates in the same manner as gate 27, which gate was previously described with respect to FIGS. 1 and 4. The output of switch 15' is connected to terminal 76a of gate 76. Gate 76 is closed when piston 20 reaches the position of the vent 19a' in piston chamber 19 as detected by control means 77 which has its output coupled to terminal 76b of gate 76. During the time that gate 76 is opened between the enabling pulse applied to terminal 76a and terminating pulse applied to terminal 76b, the output pulses from variable frequency oscillator 75 are passed through gate 76 to be counted by counter 28 and displayed by display means 29 in the same manner as was previously described with respect to FIGS. 1 and 4. The sample group of components is thereby employed for the purpose of setting the variable frequency oscillator to rapidly and accurately count the total number of components placed into the chamber 12'. The piston and cylinder assembly 19—20 may be limited in its total travel when pressurizing chambers 41 and 42 or a separate piston-cylinder assembly may be used for this operation.

FIG. 6 shows still another embodiment 80 of the present invention in which a constant pressure source 81 is coupled through a conduit 82, solenoid controlled valve 83 and a constant flow orifice 84 to a large chamber 85 having a removable cover 86 which may be airtightly sealed through gasket means such as, for example, an O-ring 87. Chamber 85 is connected through a first conduit 88 to a solenoid controlled valve 89, and a second conduit 90 and a solenoid controlled valve 91 to a pressure sensitive switch 92.

The constant pressure source 81 is further coupled through a conduit 93, solenoid controlled valve 94 and a constant flow orifice 95 to a sample container 96 having a removable cover 97 which may be airtightly sealed upon chamber 96 by a suitable gasket such as, for example, an O-ring 98. The sample chamber is connected through a conduit 99 to a solenoid controlled valve means 100 and is further coupled through a conduit 101 and solenoid controlled valve means 102 to pressure sensitive switch 92.

FIG. 7 shows the electronics employed in conjunction with the pneumatic system arrangement of FIG. 6 and is comprised of an oscillator 103 whose operating frequency may be adjusted to any suitable value and which may be selectively coupled through either gate means 104 or 105 to either a first counter 106 or to a second counter 107. Counter 106 is a countdown counter, while counter 107 is an accumulative type counter whose functions will become obvious upon a description of the operation of the system. The outputs of associated stages of each of the counters are applied to associated Exclusive OR gates 108 for comparison purposes to be more fully described. The outputs of each of the Exclusive OR gates 108 are ANDED in AND gate 109 whose output is simultaneously applied to a decimal countdown counter 110 and to an amplifier 111 for the purpose of resetting counter 107 in a manner to be more fully described. The output of decimal countdown counter 110 is applied to a display means 112 for display of the appropriate count. Counter 106 is preset at a predetermined count which indicates the maximum time required for raising the pressure in chamber 96 from ambient to a predetermined value. The reason for this will become obvious upon consideration of the operation of the system which occurs as follows:

A sample batch of pieces (say 10 pieces) is selected from the batch of substantially standard components to be counted and is placed within chamber 96. At this time solenoid controlled valves 102 and 100 are open while valve 94 is closed. The opening of valve 100 allows the pressure in sample chamber 96 to be vented to the exterior of the chamber, thereby placing the chamber at ambient pressure. Valve 100 is closed and valve 94 is open, causing gas from the constant pressure source to pass through valve 94 and constant flow orifice 95 into the interior of sample chamber 96. Oscillator 103 has its output applied to counter 106 through gate 104 which is enabled at terminal 104a simultaneously with energization or opening of the normally closed solenoid controlled valve 94. The remaining input terminal of gate 104 is coupled to the output 92a and operates to enable the passing of signals from oscillator 103 to counter 106 until the appropriate pressure level is sensed by pressure sensitive switch 92. As soon as this occurs, gate 104 is disabled, preventing pulses developed by oscillator 103 from reaching counter 106. In the case where the sample chamber is empty, the presetting of counter 106 should be stepped down to exactly zero. This is one way of checking the accuracy and reliability of fixed frequency oscillator 103, as well as the other components of the system. Thus, exact adjustment of the oscillator 103 and appropriate selection of the count in counter 106 provides a self-check upon the accuracy of the system simply by starting the operation with the sample chamber empty to see if the count in counter 106 is reduced to zero in the time in which it takes the pressure actuated switch 92 to sense the appropriate pressure condition.

With a sample of 10 pieces contained within the sample container, less time will be required to reach the pressure level at which pressure switch 92 will become activated, thereby leaving a count within counter 106 which will be greater than zero. Preferably, the sample pieces should occupy a major portion of the volume within chamber 96. The chamber 85 which has previously received the entire batch of components to be counted (less than 10 sample pieces) is then elevated to the predetermined pressure level through opening of the valve 83 which simultaneously is accompanied by an enabling pulse applied to the terminal 105a of gate 105. Previous to the initiation of this operation, solenoid controlled valve 89 has been operated to first the open and then the closed position to vent chamber 85 in order to return it to ambient pressure. With closure of solenoid controlled valve 89 and opening of solenoid controlled valve 83 (accompanied by closure of solenoid valve 94) constant pressure source 81 begins to raise the pressure of chamber 85.

The solenoid controlled valves 102 and 91 are operated to the open and closed positions, respectively, coupling pressure sensitive switch 92 to chamber 85 and isolating the switch from chamber 96. Gate 105, which is enabled simultaneously with the opening of valve 83, passes pulses from oscillator 103 into the multistage counter 107 which is of the countup or accumulative type. The outputs of each of the stages of the counter 107 are coupled to associated input terminals of Exclusive OR gates 108 in conjunction with the outputs of associated stages of counter 106. As soon as an exact comparison occurs between associated stages, the outputs of the Exclusive OR gates go to binary ONE state. If all stages of counter 106 compare simultaneously with all stages of counter 107, the Exclusive OR gates will be all binary ONE at their outputs enabling AND gate 109 to pass a binary ONE condition to a decimal countdown counter 110 which is preset to a maximum value and is reduced by the count of ten each time a compare pulse is developed at the output of AND gate 109. This means that if the chambers 85 and 96 were completely empty, the maximum number of pulses would be applied to counter 110 reducing its maximum count to zero. However, under ordinary circumstances, the components being counted will take up a rather major portion of the chamber interior causing the pressure level to be reached at a much faster rate or at a shorter time interval than the that required for reaching the pressure level with the chamber 85 being empty.

As was previously mentioned, the output pulse developed by AND gate 109 is simultaneously applied to the input of an amplifier 111 whose output is simultaneously coupled to the reset input terminals of each stage of counter 107 resetting the counter to zero and causing the fixed frequency oscillator 103 to begin a new count. Thus, each time the count in counter 107 reaches the quantity contained within counter 106, a pulse will be generated by gate 109 indicative of the fact that 10 components are contained within chamber 85. This operation is terminated as soon as pressure sensitive switch 92 becomes activated at the predetermined pressure level thereby disabling gate 105. A final display 111, coupled to counter 110, indicates the total number of components which have been counted. The counter 110, instead of being a countdown counter may be simply an accumulative counter counting the total number of pulses accumulated during the time at which the pressurization of chamber 85 has begun until the time at which the pressure level reaches a predetermined value. This amount may then be subtracted from a maximum count yielding substantially the same result although through slightly more complicated circuitry.

FIG. 8 shows a similar arrangement to that of FIG. 6 except for the constant pressure source source 81 of FIG. 6 being replaced by a pair of pressure sources 81' and 81'' which are of the piston type similar to those previously described with respect to FIGS. 1 and 4, for example. The interior volumes of the chambers of these pressure switches may be proportionally related to the volumes of the batch and sample chambers 85 and 96 respectively, in the same manner as was previously described. The operation of the system of FIG. 6, modified in the manner shown in FIG. 8, is substantially the same with the exception that the pressure sources are operated in sequential fashion, whereas in the embodiment of FIG. 6, the pressure source 81 is selectively coupled to each of the chambers 85 and 96 in a preordained sequence. The circuitry of FIG. 7 may also be employed with equal success with the pneumatic system of FIG. 5 and will operate in the same manner as described hereinabove.

It can be seen from the foregoing description that the present invention provides a variety of alternative embodiments for counting large quantities of substantially uniform parts in a fast, accurate, highly reliable manner through the employment of pneumatic techniques which assure the above advantages while eliminating the severe sensitivity and fragility of conventional techniques.

Although there has been described a preferred embodiment of this novel invention, many variations and modifications will now be apparent to those skilled in the art. Therefore, this invention is to be limited, not by the specific disclosure herein, but only by the appending claims.

I claim:

1. Means for counting large groups of elements of substantially uniform size comprising:
   chamber means for receiving a group of elements;
   means for selectively pressurizing said chamber at a predetermined flow rate;
   pressure sensitive means for sensing a predetermined pressure level in said chamber;
   means for measuring the time interval between the initiation of pressurizing said chamber and the sensing of said predetermined pressure level; and
   means coupled to said measuring means for converting said time interval into a quantity representing the total number of elements in said group.

2. Means for counting large groups of elements of substantially uniform size comprising:
   chamber means for receiving a group of elements;
   means for selectively pressurizing and depressurizing said chamber at a predetermined flow rate;
   pressure sensitive means for sensing a predetermined pressure level in said chamber;
   means for measuring the time interval between the termination of depressurization of said chamber and the sensing of said predetermined pressure level; and
   means coupled to said measuring means for converting said time interval into a quantity representing the total number of elements in said group.

3. Means for counting large groups of elements of substantially uniform size comprising:
   a pair of hollow chambers, the interiors of said chambers being coupled through conduit means;
   one of said chambers being adapted to receive a group of said elements;
   means for selectively pressurizing and depressurizing said chambers at predetermined flow rates between two predetermined pressure levels to develop a signal;
   said conduit means including selectively closable valve means for sealing said conduit means upon pressurization of said chambers at the higher of said two pressure levels;

pressure sensitive means coupled to one of said chambers for sensing one of said predetermined pressure levels; and means for measuring the time interval between the occurrence of said signal and the return of said one of said chambers to the lower of said two pressure levels to produce a count representative of the volume occupied by said elements.

4. The system of claim 3 wherein said operating means is comprised of motor means and means mechanically linking said motor means to said pressure sources for simultaneous operation.

5. The system of claim 3 wherein said measuring means is comprised of an oscillator:

counter means;

first gating means coupled between said oscillator and said counter means being activated by said pressure sensitive means upon sensing of said one predetermined pressure level to couple said oscillator to said counter means; and means coupled to said pressurizing-depressurizing operation is terminated to decouple said oscillator from said counter means.

6. The system of claim 5 wherein the operation of said oscillator is controlled by the operation of said pressurizing-depressurizing means.

7. A system for counting a large group of items of substantially uniform size comprising:

first and second chambers and first conduit means connecting their interiors;

a first pressure source coupled to one of said first and second chambers;

said first conduit means including first valve means movable between an open and a closed position;

third and fourth chambers and second conduit means connecting their interiors;

a second pressure source coupled to one of said third and fourth chambers;

said second conduit means including second valve means movable between an open and a closed position;

one of said chambers having a removable cover for receiving a group of items to be counted;

first and second pressure sensitive means coupled to one of said first and second and said third and fourth chambers respectively, for generating a first and second output respectively, upon sensing a first predetermined pressure value;

means for operating said first and second pressure to sources to initially pressurize and subsequently depressurize their associated chambers between a second pressure level higher than said first pressure level and a third pressure level equal to or less than said first pressure level; said operating means including means for simultaneously closing said valve means when said chambers are raised to said second pressure level; and means for measuring the time interval between the outputs generated by said first and second pressure sensitive means during the depressurizing of said chambers for generating an output representative of the number of the number of items in said group.

8. The system of claim 7 wherein said measuring means is comprised of an oscillator:

counter means; and gating means coupled between said oscillator and said counter means being activated when said first pressure sensitive means generates an output for coupling said oscillator to said counter means and being deactivated when said second pressure sensitive means generates an output to decouple said oscillator from said counter means.

9. A system for counting a large group of items of substantially uniform size comprising:

first and second chambers and first conduit means connecting their interiors;

a first pressure source coupled to one of said first and second chambers;

said first conduit means including first valve means movable between an open and a closed position;

third and fourth chambers and second conduit means connecting their interiors;

a second pressure source coupled to one of said third and fourth chambers;

said second conduit means including second valve means movable between an open and a closed position;

at least one of said first, second, third and fourth chambers having a removable cover for receiving a group of items to be counted;

fifth and sixth chambers and third conduit means connecting their interiors;

a third pressure source coupled to one of said fifth and sixth chambers;

said third conduit means including third valve means movable between an open and a closed position;

one of said fifth and sixth chambers having a removable cover for receiving a small quantity of said group of items;

second and third pressure sensitive means coupled to one of said second and third, third and fourth and fifth and sixth chambers, respectively; and second output respectively upon sensing a first predetermined pressure value;

means for operating said second and third pressure sources to initially pressurize and subsequently depressurize their associated chambers between a second pressure level higher than said first pressure level and a third pressure level equal to or less than said first pressure level; said operating means including means for simultaneously closing said valve means when said chambers are raised to said second pressure level;

first means for measuring the time interval between the outputs generated by said first and second pressure sensitive means during the depressurizing of said chambers;

second means for measuring the time interval between the outputs generated by said first and third pressure sensitive means during the depressurizing of said chambers; and final output means coupled to said first and second time interval measuring means for generating an output representing the total number of items contained in said one of said first, second, third and fourth chambers.

10. The system of claim 9 wherein said measuring means is comprised of an oscillator:

counter means; and gating means coupled between said oscillator and said counter means being activated when said first pressure sensitive means generates an output for coupling said oscillator to said counter means and being deactivated when said second pressure sensitive means generates an output to decouple said oscillator from said counter means.

11. The system of claim 10 further comprising:

second gating means coupled to said oscillator;

second counter means coupled to said second gating means; and said second gating means being activated by the output of said first pressure sensitive means for coupling said oscillator to said second counter means and being deactivated by the output of said third pressure sensitive means for decoupling said second counter means from said oscillator.

12. A system for measuring a group of items of substantially uniform size comprising:

a first chamber for receiving a small sample quantity of said items;

a second chamber for receiving the remainder of the items of said group;

a pressure source;

control means for selectively and consecutively coupling said pressure source to said first and second chambers;

first pressure sensitive means coupled to said first and second chambers and each being adapted to generate an output upon sensing a predetermined pressure level;

first and second valve means for selectively and consecutively coupling said pressure sensitive means to said first and second chamber chambers in cooperation with the operation of said control means;

first means for generating a third output representative of the time interval between the initiation of the pressurizing of said first chamber and the generation of said output by said first pressure sensitive means;

second means for generating a fourth output representative of the time interval between the initiation of the pressurizing of said second chamber and the generation of an output by said second pressure sensitive means; and third means for receiving said third and fourth outputs for generating a fifth output representing the number of items in said second chamber.

13. The system of claim 12 wherein said pressure sources are each comprised of a piston chamber and a reciprocating piston driven by said motor means through said mechanical linking means.

14. The system of claim 12 wherein said first and second means are comprised of first and second counter means, respectively:

said third means comprising comparing means coupled to said first and second counter means for generating an output each time the counts in said first and second counter means compare;

fourth means responsive to the output of said comparing means for resetting said second counter means; and fifth means for counting the outputs generated by said comparing means.